US008578496B1

(12) United States Patent
Krishnappa

(10) Patent No.: US 8,578,496 B1
(45) Date of Patent: Nov. 5, 2013

(54) METHOD AND APPARATUS FOR DETECTING LEGITIMATE COMPUTER OPERATION MISREPRESENTATION

(75) Inventor: Bhaskar Krishnappa, Hucclecote (GB)

(73) Assignee: Symantec Corporation, Mountain View, CA (US)

( * ) Notice: Subject to any disclaimer, the term of this patent is extended or adjusted under 35 U.S.C. 154(b) by 576 days.

(21) Appl. No.: 12/648,853

(22) Filed: Dec. 29, 2009

(51) Int. Cl.
*G06F 7/04* (2006.01)
(52) U.S. Cl.
USPC ............... 726/24; 726/23; 726/25; 726/26; 713/187; 713/188
(58) Field of Classification Search
USPC .............. 726/22, 23, 24; 709/224; 455/410
See application file for complete search history.

(56) References Cited

U.S. PATENT DOCUMENTS

| 2006/0068755 A1* | 3/2006 | Shraim et al. ............... 455/410 |
| 2007/0204033 A1* | 8/2007 | Bookbinder et al. ......... 709/224 |
| 2008/0196100 A1* | 8/2008 | Madhavan et al. ............ 726/22 |

* cited by examiner

*Primary Examiner* — Longbit Chai
(74) *Attorney, Agent, or Firm* — Wilmer Cutler Pickering Hale and Dorr LLP

(57) ABSTRACT

A method for detecting legitimate computer operation misrepresentation is provided. In some embodiments, the method comprises monitoring internet activity associated with a user computer, comparing the internet activity with suspicious feature information to produce a comparison result, wherein the suspicious feature information comprises at least one image that misrepresents at least one legitimate computer operation, identifying fraudulent software based on the comparison result, wherein the comparison result indicates a portion of the internet activity that misrepresents the at least one legitimate computer operation and mitigating activities associated with the identified fraudulent software.

20 Claims, 9 Drawing Sheets

SYSTEM 100

METHOD AND APPARATUS FOR DETECTING LEGITIMATE COMPUTER OPERATION MISREPRESENTATION

BACKGROUND

1. Field of the Invention

Embodiments of the present invention generally relate to computer security systems and, more particularly, to a method and apparatus for detecting legitimate computer operation misrepresentation.

2. Description of the Related Art

Widespread Internet usage by small to large organizations results in an increase in computer-related attacks. Various malicious software programs (e.g., viruses, Trojan horses, worms and/or the like) cause many of these related computer attacks. These malicious software programs may be transmitted (i.e. downloaded) to a vulnerable computer without user consent and/or knowledge as executable programs, email attachments, multimedia files (e.g., video files, audio files and/or the like), malicious HTML code on web pages and/or the like.

The malicious software programs may exert control over an operating system and modify various files (e.g., system registry entries) and/or settings (e.g., background color, screen saver and/or the like) in order to disrupt normal operation. The malicious software programs may also exploit the user computer for illegitimate purposes. For example, a certain malicious software program may misappropriate sensitive data, such as intellectual property, customer data, medical histories, financial records, purchase orders, legal documents, privileged and/or confidential information, social security numbers, addresses, pictures, documents, contacts and/or the like.

Occasionally, a user may be enticed and/or redirected to a website that hosts such malicious software programs. The user may be enticed by an email or a posting on social networking websites (e.g., Orkut, Facebook and/or the like) that includes a link to the website. The user may also be enticed when search engine search results provide links to the website. For example, a hacker may fill hosted webpages with common keywords in order to gain a higher ranking by the search engine. When the user inputs any of these keywords, the search engine provides links to these webpages amongst the top ten search results. Upon accessing the website and following given instructions, the user computer downloads the malicious software programs, which may corrupt critical data and/or cause a system crash or system malfunctioning.

For example, fraudulent virus scanning software programs may pretend to scan the user computer for malicious software programs. The fraudulent virus scanning software programs purport to be legitimate anti-virus scanners and trick the user using similar imagery. For example, these fraudulent virus scanning software programs may depict progress bars, alert dialog boxes, malware names, drives scanned and/or infected and/or the like. After the user follows fraudulent instructions, a malicious software program may be downloaded to the user computer without the user's consent. The malicious software program may subsequently modify the user's settings (e.g., home page, error page, desktop back ground and/or the like) and/or prompt the user to purchase an updated version.

Accordingly, the small to large organizations may employ various security software programs (e.g., anti-virus, anti-spyware and/or anti-phishing software programs) to detect and prevent the execution of such malicious software programs. The security software programs, however, depend upon prior knowledge of signatures and, therefore, are limited to detecting malicious software programs for which the signature is available. Accordingly, the security software programs are unable to detect a malicious software program for which a code-based signature or an activity-based signature is unknown. Further, the security software programs cannot identify legitimate computer operation misrepresentation.

Therefore, there is a need in the art for a method and apparatus for detecting legitimate computer operation misrepresentation.

SUMMARY OF THE INVENTION

Embodiments of the present disclosure generally include a method and apparatus for detecting legitimate computer operation misrepresentation. In one embodiment, a method for using one or more processors to detect legitimate computer operation misrepresentation in memory comprises monitoring internet activity associated with a user computer, comparing the internet activity with suspicious feature information to produce a comparison result, wherein the suspicious feature information comprises at least one image that misrepresents at least one legitimate computer operation, identifying fraudulent software based on the comparison result, wherein the comparison result indicates a portion of the internet activity that misrepresents the at least one legitimate computer operation and mitigating activities associated with the identified fraudulent software.

In some embodiments, activities associated with the identified fraudulent software are prevented for execution. In some embodiments, transmission of the identified fraudulent software to the user computer is blocked. In some embodiments, at least one webpage associated with the identified fraudulent software is terminated. In some embodiments, at least one computer setting modification by the identified fraudulent software is determined. In some embodiments, the identified fraudulent software is communicated for analysis. In some embodiments, execution of the identified fraudulent software is terminated. In some embodiments, the internet activity and the suspicious feature information is transformed into the comparison result, which indicates the activities associated with the identified fraudulent software. In some embodiments, at least one image depicting at least one of media player software or security software is identified. In some embodiments, at least one image depicting at least one fraudulent alert associated with at least one of media player software or security software is identified.

In another embodiment, an apparatus for using one or more processors to detect legitimate computer operation misrepresentation in memory includes means for monitoring internet activity associated with a user computer, means for comparing the internet activity with suspicious feature information to produce a comparison result, wherein the suspicious feature information comprises at least one image that misrepresents a legitimate computer operation, means for identifying fraudulent software based on the comparison result, wherein the comparison result indicates a portion of the internet activity that misrepresents the at least one legitimate computer operation and handling activities associated with the identified fraudulent software.

In some embodiments, the apparatus further includes means for transforming the internet activity and the suspicious feature information into the comparison result. In some embodiments, the apparatus further includes means for preventing execution of malware associated with the identified fraudulent software. In some embodiments, the apparatus further includes means for blocking transmission of malware to the user computer. In some embodiments, the apparatus further includes means for terminating at least one webpage associated with the identified fraudulent software.

In yet another embodiment, a computer-readable-storage medium comprising one or more processor-executable instructions that, when executed by at least one processor, causes the at least one processor to monitor internet activity associated with a user computer, compare the internet activity with suspicious feature information to produce a comparison result, wherein the suspicious feature information comprises at least one image that misrepresents a legitimate computer operation, identify fraudulent software based on the comparison result, wherein the comparison result indicates a portion of the internet activity that misrepresents the at least one legitimate computer operation and mitigate activities associated with the identified fraudulent software.

In some embodiments, the one or more processor-executable instructions may terminate execution of the identified fraudulent software. In some embodiments, the one or more processor-executable instructions may prevent execution of malware on the user computer. In some embodiments, the one or more processor-executable instructions may block transmission of malware to the user computer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained in detail further below, various embodiments of the present disclosure enable detection of legitimate computer operation misrepresentation using suspicious feature information. The suspicious feature information includes one or more images that misrepresent various portions of various legitimate computer operations, such as scanning a file system for malware and/or playing a video through the Internet. A monitoring module (e.g., a monitoring module 314 of FIG. 3) monitors Internet activity and cooperates with a comparison module (e.g., the comparison module 316 of FIG. 3) to compare the Internet activity with the suspicious feature information. The comparison module may produce a comparison result (e.g., a comparison result 328 of FIG. 3) using any image and/or word matches. The comparison result may be examined to identify fraudulent software on the user computer that misrepresents the legitimate computer operations. Then, a mitigation module (e.g., a mitigation module 320 of FIG. 3) handles any suspicious activities associated with the fraudulent software in order to prevent and/or mitigate damage to the user computer.

Figure 1:
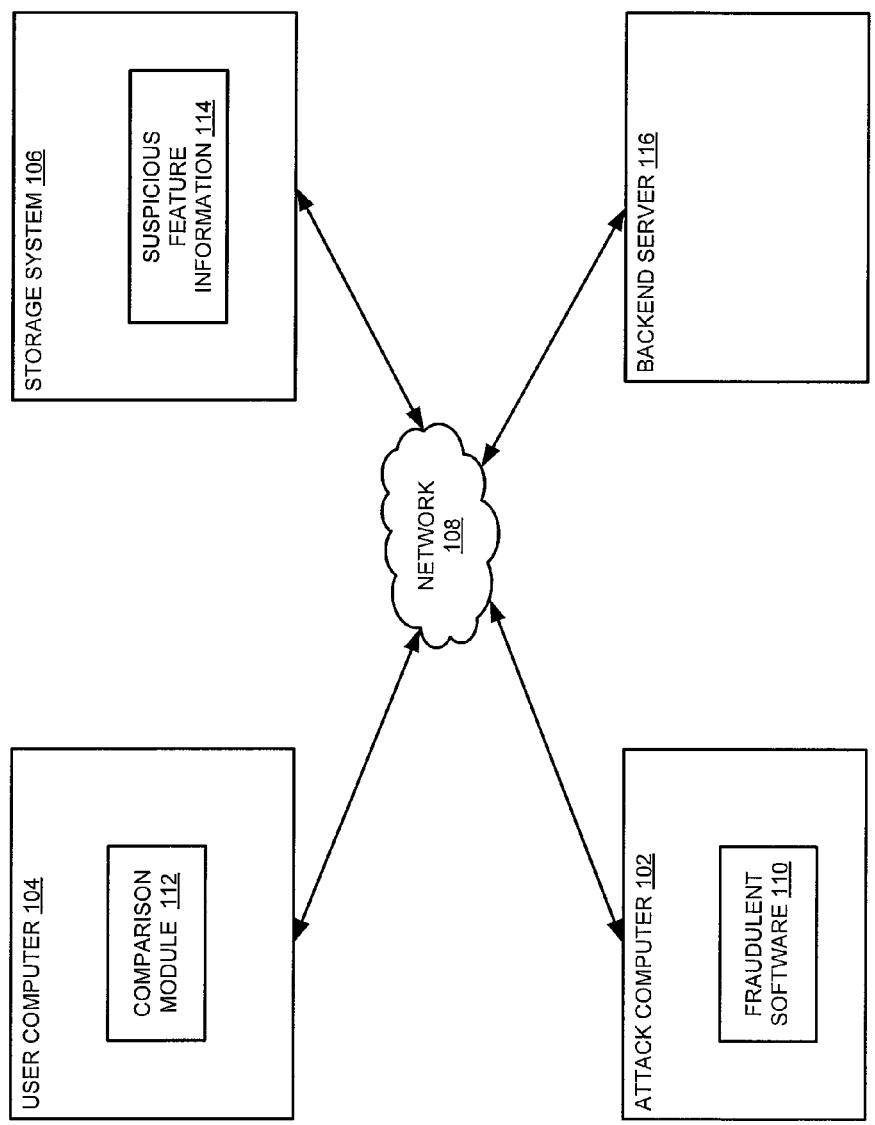
FIG. 1 is a block diagram of a system for detecting legitimate computer operation misrepresentation, according to one or more embodiments.

FIG. 1 is a block diagram of a system 100 for detecting legitimate computer operation misrepresentation according to one embodiment. The system 100 may form a computing environment that includes an attack computer 102, a user computer 104, a storage system 106 and a backend server 116 where each is coupled to each other through a network 108.

The attack computer 102 is a type of computing device (e.g., a laptop, a desktop, a Personal Digital Assistant (PDA) and/or the like), such as those generally known in the art. The attack computer 102 includes fraudulent software 110 (e.g., software programs that purport to be legitimate software programs, such as fake multimedia players, fake antivirus scanners and/or the like). A hacker may utilize the attack computer 102 to distribute the fraudulent software 110 to several computers, such as the user computer 104. As soon as the user computer 104 executes malicious software code (e.g., spyware, viruses, rootkits and/or the like), the fraudulent software 110 compromises computer security by enabling malware transmission and execution, which causes critical operation disruption and/or sensitive data misappropriation (e.g., passwords, login names, credit card details and/or the like).

The user computer 104 is a type of computing device (e.g., a laptop, a desktop, a Personal Digital Assistant (PDA) and/or the like) known to one of ordinary skill in the art having the benefit of this disclosure. The user computer 104 includes a comparison module 112 as explained further below. Generally, people utilize the user computer 104 is utilized by the user to access various Internet resources, such as web pages, various content (e.g., dynamic or static content in the form of images, video and/or audio), online services (e.g., social networking), applications, databases and/or the like. Such internet activity is monitored and examined in order to identify and prevent execution of the fraudulent software 110 as explained in the present disclosure.

The storage system 106 generally includes various components (i.e., hardware and/or software) that are configured to manage storage resources within the system 100. The storage system 106 may include one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for one or more computing devices, such as the user computer 104. In one embodiment, the storage system 106 includes one or more database systems, which may maintain various data, such as suspicious feature information 114.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the Internet or Intranet using various communications infrastructure such as Ethernet, WiFi, WiMax, General Packet Radio Service (GPRS), and the like. As another example, the network 108 may form a portion of a Storage Area Network (SAN) that includes Fibre channel switches and/or ISCSI block storage devices.

The fraudulent software 110 includes software code that when executed, causes degradation and disruption to stability and performance of the user computer 104. Once the fraudulent software 110 realizes control over the user computer 104, the fraudulent software 110 may compromise network security, sensitive data such as personal information or online credentials (e.g., a login name, a password, social security number, credit card details and the like), and/or the like. In one or more embodiments, the attack computer 102 may transmit the fraudulent software 110 onto the user computer 104 through various channels, such as an executable file download, an email attachment, malicious HTML code on a web page and/or the like. For example, the user may accidently download the fraudulent software 110 while browsing a malicious website.

In some embodiments, the comparison module 112 includes software code (e.g., processor executable instructions) that may be configured to access the internet activity associated with the user computer 104 and generate a comparison result. As explained further below, the comparison module 112 produces a comparison result between the internet activity and the suspicious feature information 114 that may indicate malicious software activities and facilitate malicious software detection. In some embodiments, the comparison module 112 may be further configured to identify one or more images that depict multimedia player software, security software and/or the like. In some embodiments, the comparison module 112 identifies the one or more images that depict one or more fraudulent alerts associated with one or more of media players, security software programs and/or the like.

According to various embodiments, the suspicious feature information 114 includes one or more images that are normally associated with a multimedia player (e.g. a progress bar, video player, play button, pause button, stop button and/or the like) and/or security software (e.g., malware details, a file scan progress bar, a file system view of hard drives with infected files and/or the like) as well as alert/message boxes (e.g., player out of date, player crashed, update codec, purchase codec, your system is not protected and/or the like). These images facilitate legitimate computer operation misrepresentation for malicious purposes. The comparison module 112 utilizes the suspicious feature information 114 to identify legitimate computer operation misrepresentation as described further below.

In some embodiments, the backend server 116 may include one or more computing devices that cooperate in order to analyze suspicious software code, such as the fraudulent software 110. As described further below, the fraudulent software 110 may be communicated to the backed server 116 for further research. The backend server 116 may execute the fraudulent software 110 and identify one or more images that misrepresent legitimate computer operations. The backend server 116 may populate the suspicious feature information 114 using these identified images.

Figure 2:
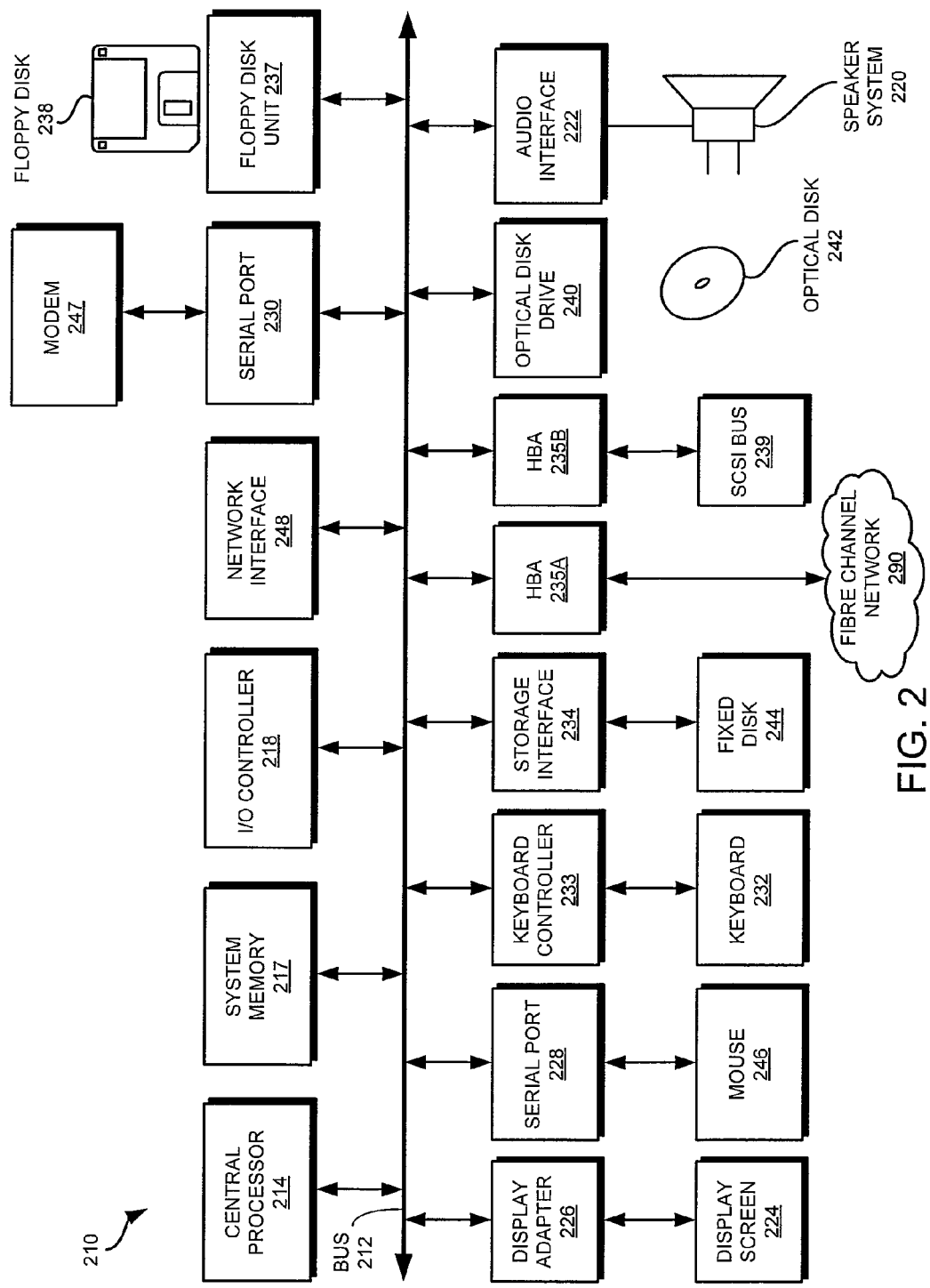
FIG. 2 is a block diagram of a suitable computer for implementing the present disclosure, according to one or more embodiments.

FIG. 2 is a block diagram of a computer system 210 suitable for implementing the present disclosure. This system 210 is representative of a computer system that can be used to implement the attack computer 102 and/or the user computer 104 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
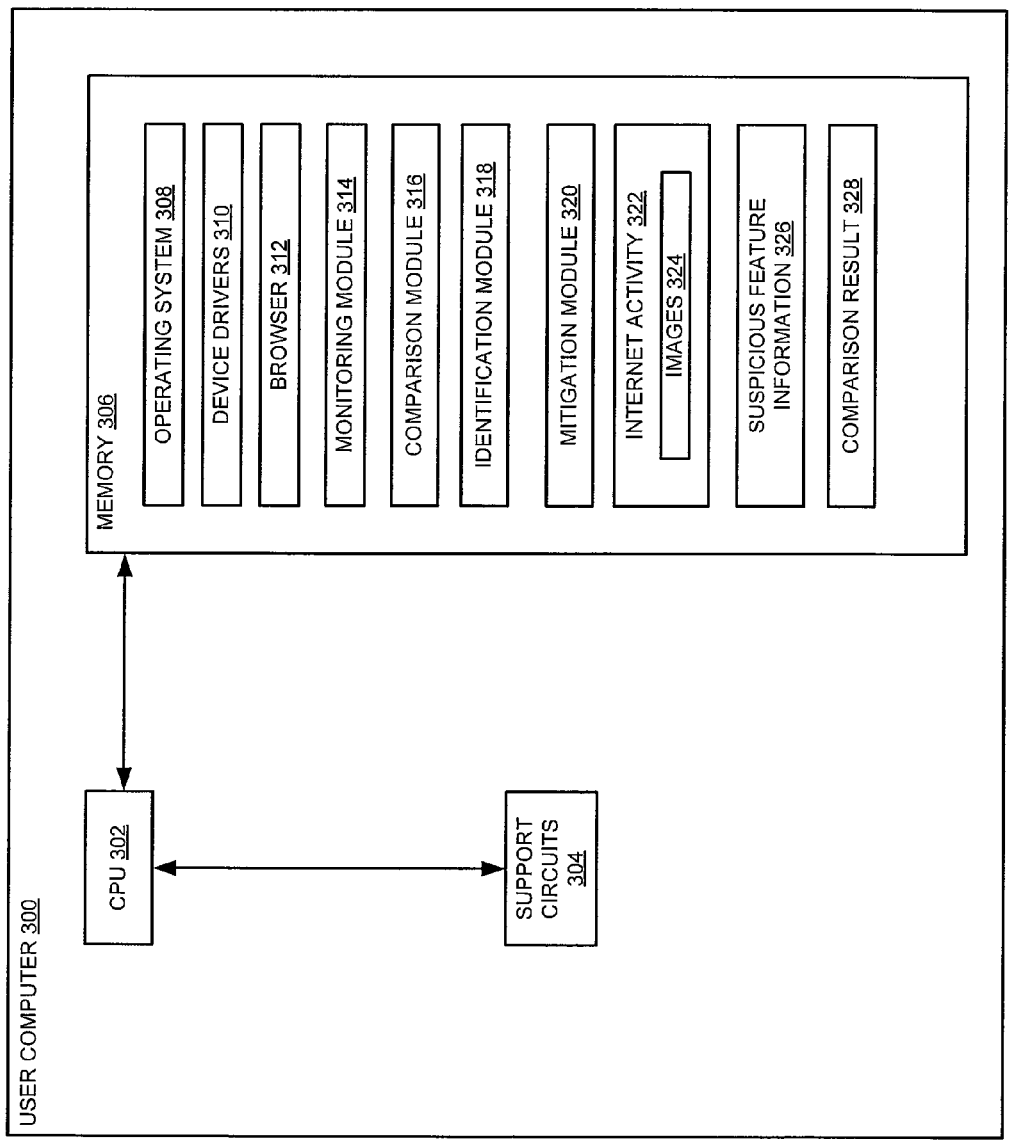
FIG. 3 is a block diagram of a user computer for detecting legitimate computer operation misrepresentation, according to one or more embodiments.

FIG. 3 is a block diagram of a user computer 300 for detecting legitimate computer operation misrepresentation according to various embodiments.

The user computer 300 is a type of computing device (e.g., a laptop, a desktop, a Personal Digital Assistant (PDA) and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes an operating system 308, device drivers 310 as well as various data and software packages, such as a browser 312, a monitoring module 314, a comparison module 316, an identification module 318, a mitigation module 320, internet activity 322, images 324, suspicious feature information 326 and a comparison result 328.

The operating system 308 generally manages various computer resources (e.g., network resources, data storage resources, file system resources and/or the like). The operating system 308 is configured to execute operations on one or more hardware and/or software devices, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a Network Interface Card (NIC) card to communicate data to another computer as explained further below.

According to various embodiments, the browser 312 (e.g., Internet Explorer (IE), FireFox, Mozilla, Google Chrome and/or the like) includes software code that facilitates access to various Internet resources such as email, blogs, videos, periodicals, databases, social networking websites and/or the like. The user computer 300 may utilize the browser 312 to access such Internet resources. As such, the various Internet resources accessed by the user are maintained as the Internet activity 322 as explained further below.

In one embodiment, the Internet activity 322 includes information associated with one or more websites visited by the user such as Uniform Resource Locators (URLs), domain names, file names and/or the like. For example, the user may regularly access the one or more websites to communicate with other users (e.g., through Instant Messaging (IM) and/or emails), conduct research (e.g., through educational websites, digital libraries and expert discussion forums), perform business applications (e.g., online securities trading and bank account management), for personal entertainment (e.g., downloading playing online videos, or games) and/or the like. In some embodiments, the Internet activity 322 may include various images 324.

In one or more embodiments, the images 324 may include computer graphical images that misrepresent various portions of a particular legitimate computer operation, such as scanning files for viruses, playing a multimedia file and/or the like. Some of the images 324 may depict properties commonly associated with a fake multimedia player using a progress bar, various buttons (e.g., play button, pause button, stop button and/or the like), computer drive letters/names, various message boxes (e.g., alerts, such as player out of date, player crashed, update codec, purchase codec, your system is not protected and/or the like). These images 324 may be utilized by fraudulent software to misrepresent a legitimate multimedia player (e.g., MICROSOFT media player). For example, a certain image depicting a progress bar may fraudulently portray a video being played and trick the computer user into downloading malware and/or providing sensitive data (e.g., a credit card number).

As described in detail further below, the suspicious feature information 326 (e.g., the suspicious feature information 114 of FIG. 1) includes various images that depict one or more portions of one or more legitimate computer operations, such as file scans and audio/video codec updates/installations. These images may be utilized by fraudulent software in order to misrepresent the legitimate software operations on the user computer 300. The suspicious feature information 326 may be a local copy of global suspicious feature information that is stored on a remote storage system (e.g., the storage system 106 of FIG. 1) as described further below.

In one or more embodiments, the monitoring module 314 includes software code (e.g., processor executable instruction) that is stored in the memory 306, executed by the CPU 302 and configured to process data transmitted between with the user computer 300 and the Internet. The monitoring module 314 may examine one or more downloaded images and/or executed files (e.g., video/audio files, software programs and/ or the like). The monitoring module 314 may store these downloaded images in the Internet activity 322 as described in the present disclosure.

According to various embodiments, the comparison module 316 includes software code (e.g., processor executable instructions) stored in the memory 306 that when executed by the CPU 302 evaluates the Internet activity 324 and the suspicious feature information 326 and generates the comparison result 328. In one or more embodiments, the comparison module 316 accesses the suspicious feature information 326 from the remote storage system. In some embodiments, the comparison module 316 compares the images 324 with the suspicious feature information 326 in order to identify one or more images that misrepresent one or more legitimate computer operations. In operation, the comparison module 316 may utilize various image processing techniques that are well known in the art to match one or more images, words and/or the like between the internet activity 322 and the suspicious feature information 326.

According to various embodiments, the identification module 318 includes software code (e.g., processor executable instructions) stored in the memory 306 that when executed by the CPU 302 detects fraudulent software (e.g., the fraudulent software 110 of FIG. 1), such as fraudulent multimedia player software and/or security software, based on the comparison result 328. The comparison result 328 may indicate one or more portions (e.g., images and/or words) of the Internet activity 322 that misrepresent legitimate computer operations. In one or more embodiments, the identification module 318 examines one or more image matches between the images 324 and the suspicious feature information 326 in order to identify the fraudulent software within the user computer 300.

As an example, the fraudulent software may generate a fake multimedia player that purports to play a media file. The fraudulent software subsequently displays an error message that informs the user of missing and/or corrupted files (e.g., an audio/video codec) as well as a link to website for installing these files. Before the fraudulent software redirects the user to a website that hosts malware, the comparison module 316 examines various buttons, such as a play button, and/or the error message that are used by the fake multimedia player and identifies matching images within the suspicious feature information 326. If the identification module 318 determines that these buttons and the error message are features commonly associated with the fraudulent software, the identification module 318 instructs the mitigation module 320 to handle any suspicious activities as explained further below. For example, the mitigation module 320 may flag the link and the fake multimedia player as malicious and send the link to a research group located at a backend server (e.g., the backend server 116 of FIG. 1).

As another example, the fraudulent software may create a fake anti-virus scanner that imitates a file system scan by legitimate security software (e.g., SYMANTEC Norton security products). The fake anti-virus scanner may include a progress bar that depicts details related to the file system scan. The fraudulent software immediately produces a fraudulent alert within a dialog box that informs the user of several infections as well as a link to a website for downloading a full version of the fake anti-virus scanner and/or making an online purchase. Before the user accesses the website, the comparison module 316 compares the fraudulent alert and the progress bar to the suspicious feature information 326 to produce the comparison result 328. If the comparison result 328 indicates that the fraudulent alert as well as progress bar are known to be utilized by the fraudulent software, the identification module 318 cooperates with the mitigation module 320 to handle any suspicious activities associated with the fraudulent software. For example, the mitigation module 320 may flag the link and the fake anti-virus scanner as malicious and send the link to a research group located at the backend server 116.

In some embodiments, the mitigation module 320 includes software code (e.g., processor executable instructions) stored in the memory 306 that when executed by the CPU 302 handles any deleterious activities associated with the fraudulent software. In some embodiments, the mitigation module 320 may terminate the fraudulent software. The mitigation module 320 may also block any transmission of malware onto the user computer 300. If the fraudulent software successfully downloads the malware onto the user computer 300, the mitigation module 320 prevents execution of the malware according to one embodiment. If the malware successfully executes, the mitigation module 320 terminates the malware according to one embodiment. The mitigation module 320 may also terminate one or more web pages associated with the malware. In some embodiments, the mitigation module 320 communicates an alert to the user.

In some embodiments, the mitigation module 320 determines one or more computer setting modifications caused by the malware and stores these modifications in the global suspicious feature information. For example, the malware may change one background and/or screen saver settings. Because the fraudulent software may utilize one or more images and/or words in order to surreptitiously execute the malware, the mitigation module 320 stores such images and/or words in the global suspicious feature information. Some of these images and/or words may be unknown and therefore, useful in preventing future attacks by the fraudulent software.

The mitigation module 320 may communicate these new images and/or words to a backend server (e.g., the backend server 116 of FIG. 1) for further research and analysis. The mitigation module 320 may also communicate the fraudulent software and/or the malware to the backend server. The mitigation module 320 may also communicate a Uniform Resource Locator (URL), domain name, the comparison result 328 and/or the like to the backed server. If it is determined that the URL and/or the domain name are legitimate then the URL and the domain name are whitelisted to prevent future false positives. Alternatively, if the URL and/or the domain name are illegitimate, then signatures are computed for the malware and stored in a signature database. In addition, the URL and the domain name may be blacklisted.

Figure 4:
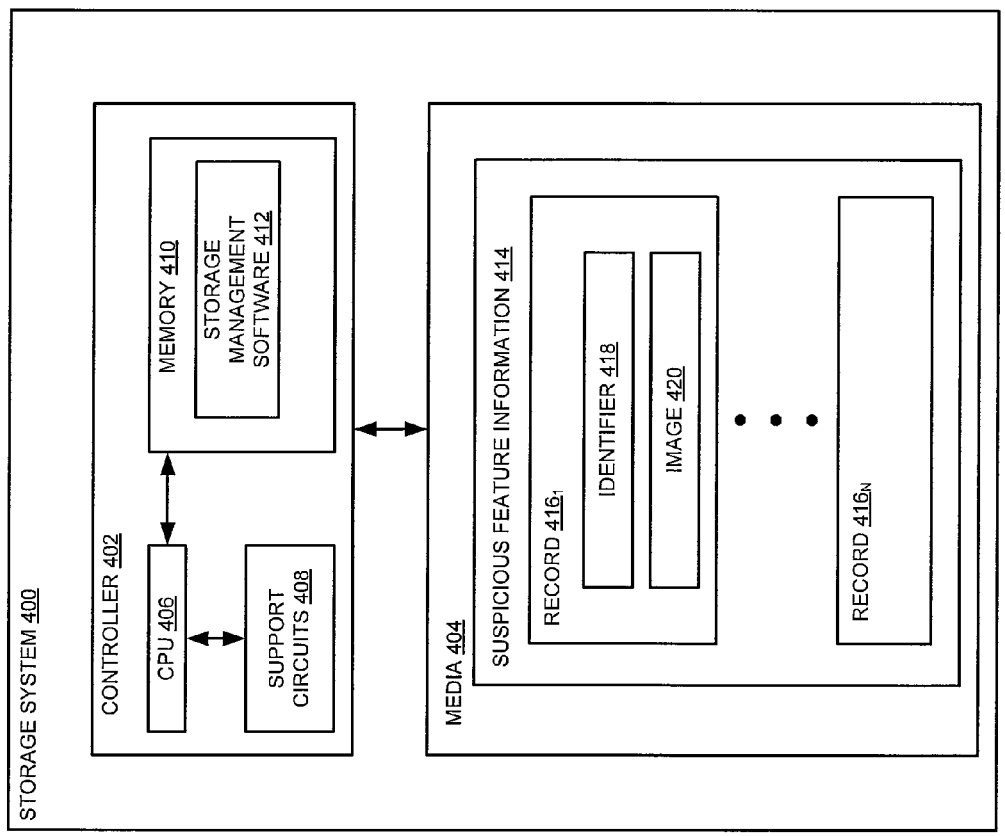
FIG. 4 is a block diagram of a storage system for detecting legitimate computer operation misrepresentation, according to one or more embodiments.

FIG. 4 is a block diagram of a storage system 400 for detecting legitimate computer operation misrepresentation according to one or more embodiments.

The storage system 400 generally includes various components (i.e., hardware and/or software) that are configured to manage storage resources within a computing environment. The storage system 400 includes a controller 402 and storage media 404 to facilitate data storage. The storage media 404 may include one or more data storage devices (e.g., hard disk drives, optical drives, magnetic tape drives and/or the like) in which one or more storage units (e.g., LUNs) are arranged. The storage controller 402 may include a CPU 406, various support circuits 408 and memory 410. The memory 410 includes storage management software 412 that provides an interface (e.g., Integrated Drive Electronics/AT Attachment (IDE/ATA), Small Computer Systems Interface (SCSI) and/or the like) to the one or more data storage devices for one or more computing devices, such as user computers (e.g., the user computer 104 of FIG. 1 and/or the user computer 300 of FIG. 3).

According to various embodiments, the storage media 404 includes suspicious feature information 414 in the form of a database that includes a plurality of records 416. Each of the records 416 includes an identifier 418 and image 420. According to one embodiment, the identifier 418 is associated with the image 420. The identifier 418 may be utilized to uniquely determine the image 420. The image 420 may be a file (e.g., a .bmp, a .jpeg, a .jpg, an .ico, a .tiff, a .gif) that depicts a component of a legitimate computer operation, such as a progress bar, a dialog box, an alert box and/or the like. Fraudulent software may utilize the image 420 to misrepresent the legitimate computer operation for malicious purposes as described in the present disclosure.

Figure 5:
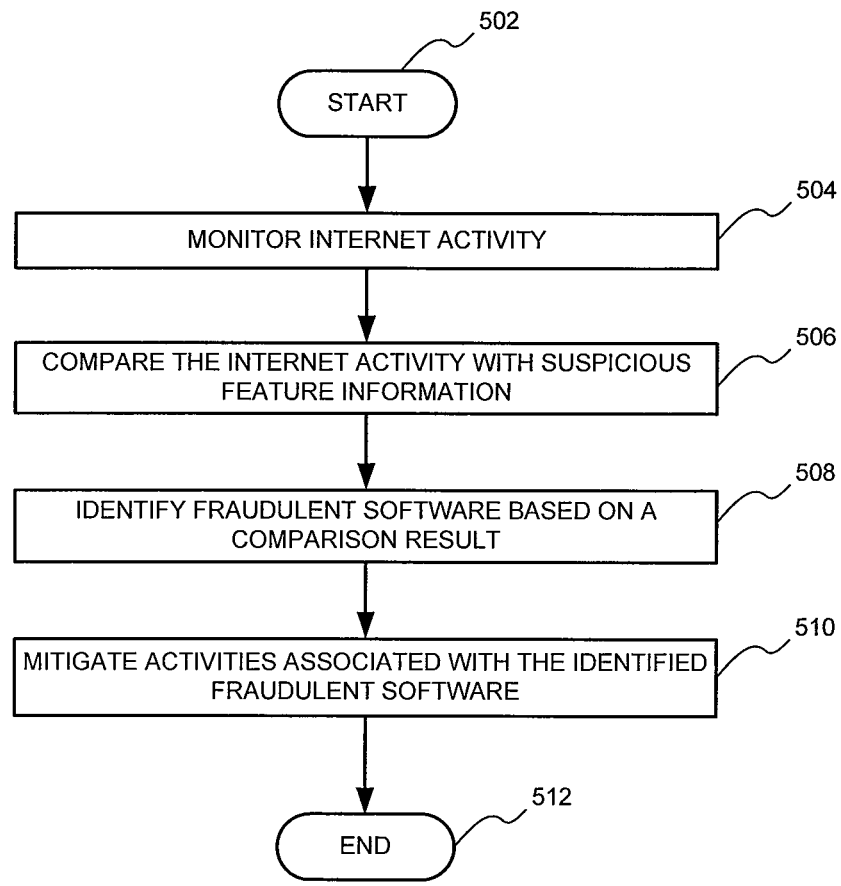
FIG. 5 is a flow diagram of a method for detecting legitimate computer operation misrepresentation, according to one or more embodiments.

FIG. 5 is a flow diagram of a method 500 for detecting legitimate computer operation misrepresentation according to one or more embodiments.

The method 500 starts at step 502 and proceeds to step 504. At step 504, the Internet activity is monitored. In some embodiments, a monitoring module (e.g., the monitoring module 314 of FIG. 3) is executed by one or more processors to record Internet activity (e.g., the internet activity 322 of FIG. 3) as described in the present disclosure.

At step 506, the internet activity is compared with suspicious feature information (e.g., the suspicious feature information 114 of FIG. 1, the suspicious feature information 326 of FIG. 3 and the suspicious feature information 414 of FIG. 4). In some embodiments, the monitoring module and a comparison module (e.g., the comparison module 112 of FIG. 1 and/or the comparison module 316 of FIG. 3) cooperate to transform the internet activity and the suspicious feature information into a comparison result (e.g., the comparison result 328 of FIG. 3). In some embodiments, the comparison module accesses and examines the Internet activity in order to perform a comparison between one or more downloaded images and/or words and the suspicious feature information. In some embodiments, the comparison module stores one or more image and/or word matches as the comparison result. The comparison result may include the image and/or word matches between the Internet activity and the suspicious feature information. These matches may indicate one or more suspicious portions of the internet activity that may be malicious activities normally associated with particular fraudulent software, such as a fake antivirus scanner or a multimedia player.

At step 508, fraudulent software is identified based on the comparison result. In one or more embodiments, an identification module (e.g., the identification module 318 of FIG. 3) is executed by one or more processors (e.g., the CPU 302 of FIG. 3) to examine the comparison result for suspicious activities and identify the fraudulent software. If one or more images match images that are normally utilized by the fraudulent software, the identification module instructs a mitigation module (e.g., the mitigation module 320 of FIG. 3) to mitigate the suspicious activities associated with the fraudulent software as described below. For example, the identification module may determine that the fraudulent software is attempting to trick the user into downloading malware by buying a fake security software subscription. Accordingly, the identification module instructs the mitigation module to block any transmission of the malware onto a user computer (e.g., the user computer 300 of FIG. 3).

At step 510, one or more activities associated with the fraudulent software are mitigated. According to various embodiments, the mitigation module is executed by one or more processors (e.g., the CPU 302 of FIG. 3) to handle the activities associated with the fraudulent software. The mitigation module may be configured to terminate the fraudulent software as well as any related web pages and/or dialog boxes (e.g., MICROSOFT Windows Controls). The mitigation module may also prevent the execution of any malware. According to various embodiments, the mitigation module may determine one or more computer setting modifications caused by the malware and communicates an alert informing the user of such modifications. In some embodiments, the mitigation module may communicate the malware for further analysis. The method 500 proceeds to step 512, where the method 500 ends.

Figure 6:
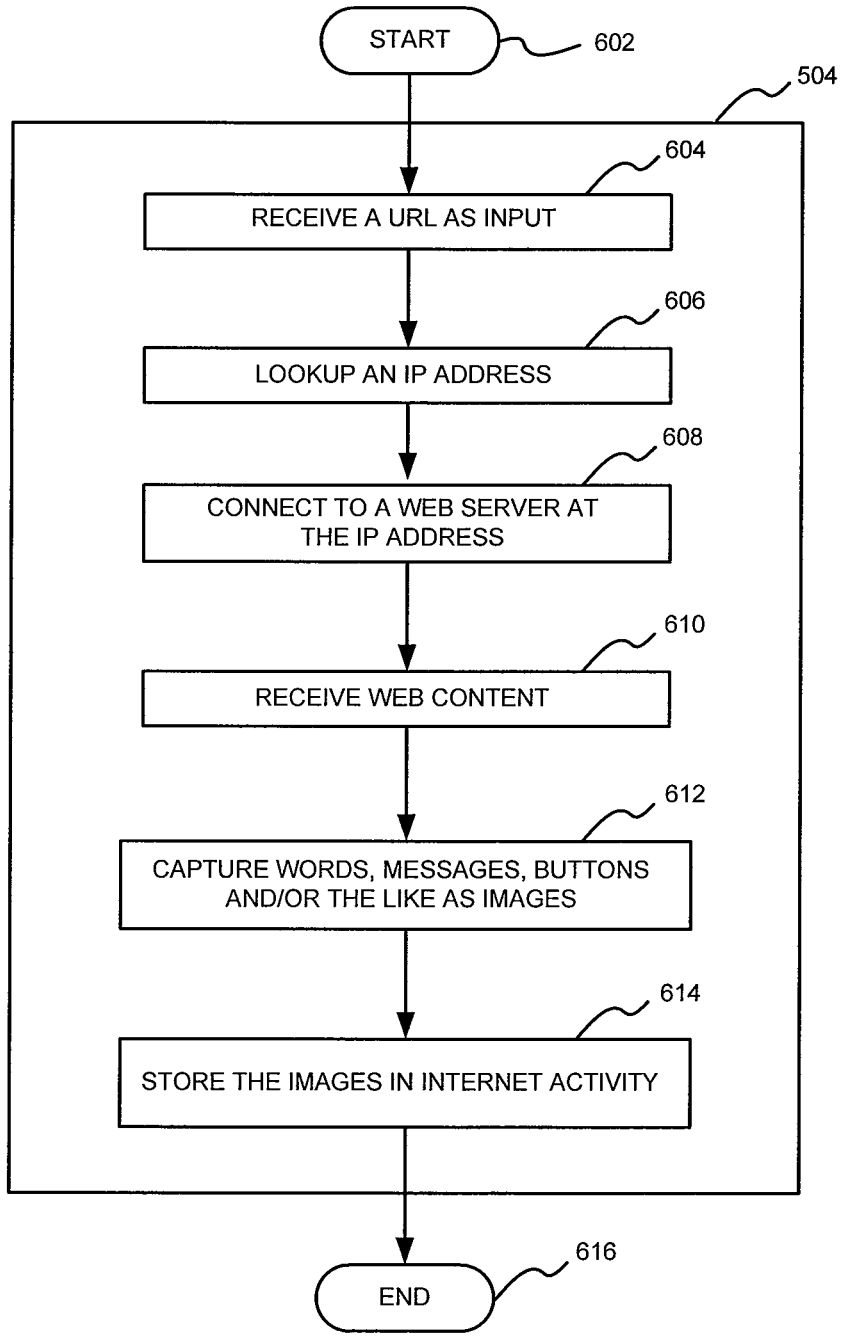
FIG. 6 is a flow diagram of a method for monitoring Internet activity, according to one or more embodiments.

FIG. 6 is a flow diagram of a method 600 for monitoring Internet activity at a user computer, according to one or more embodiments. The method 600 includes an embodiment of the step 504 of the method 500. A browser (e.g., the browser 312 of FIG. 3) and a monitoring module (e.g., the monitoring module 314 of FIG. 3) may be recalled from memory (e.g., the memory 306 of FIG. 3) and executed by one or more processors (e.g., the CPU 302 of FIG. 3) to perform one or more steps of the method 600 as explained in detail below.

The method 600 starts at step 602 and proceeds to step 604. At step 604, a URL is received as input. At step 606, an IP address that corresponds with the URL is determined. At step 608, a web server at the IP address is connected to a user computer. At step 610, web content is received from the web server. For example, a user may enter the URL into a browser window in order to open one or more web pages. The browser examines domain name system (DNS) information (e.g., responses from a DNS server) and identifies the web server hosting the web content for the URL. The browser communicates requests (e.g., HTTP requests) to the web server, which responds by transmitting the web content to the user computer. The browser displays the web content to the user through the one or more web pages.

At step 612, words, messages, buttons and/or the like are captured. As the browser generates the web pages, the monitoring module processes various portions of the web content and identifies one or more images depicting error messages, missing files/codecs, malware names/infections, drive letters, multimedia player functions (e.g., play, stop, rewind and/or the like), embedded links, offers to purchase software or a subscription service and/or the like. At step 614, the images are stored in the Internet activity. At step 616, the method 600 ends.

Figure 7:
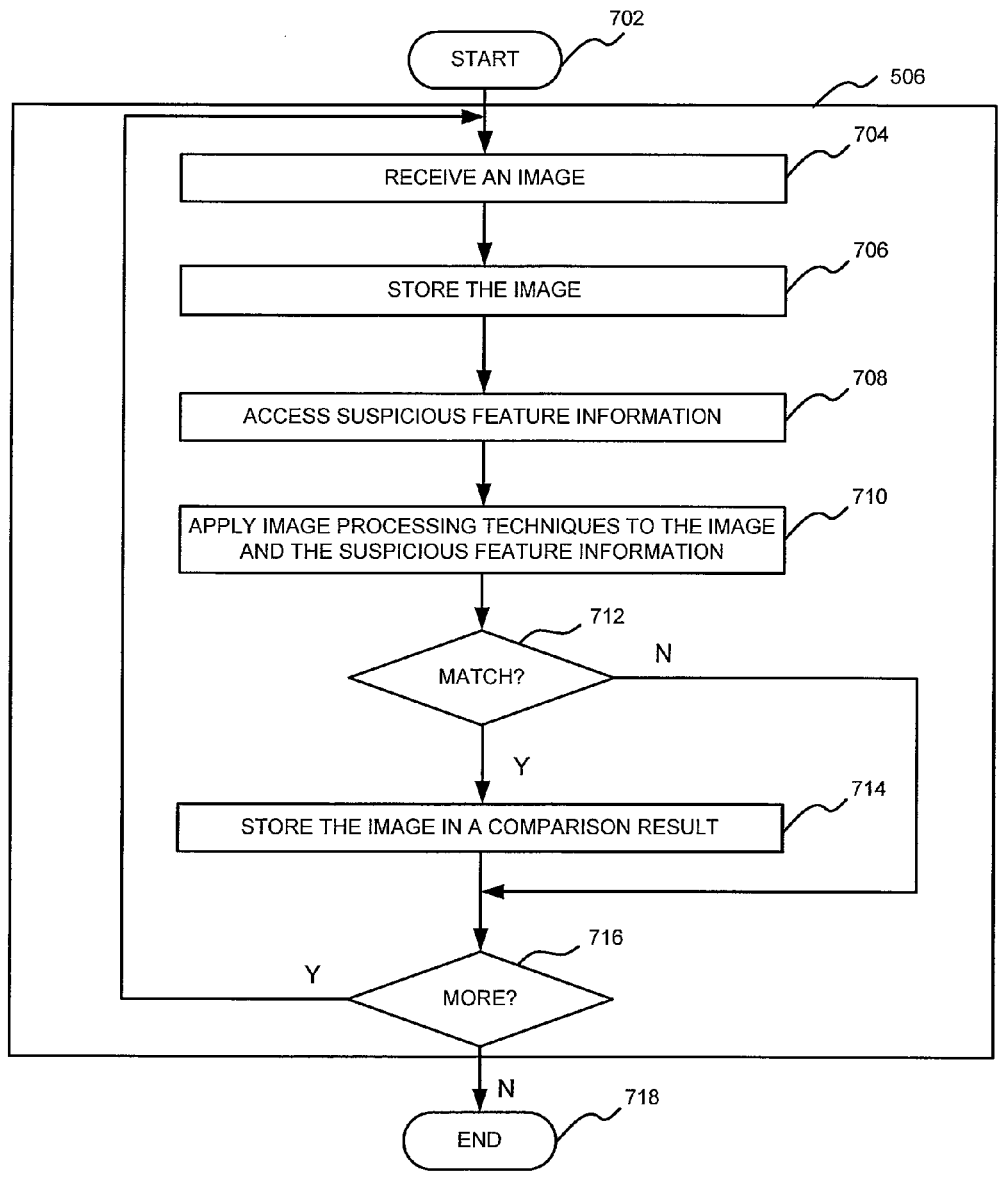
FIG. 7 is a flow diagram of a method for comparing Internet activity with suspicious feature information, according to one or more embodiments.

FIG. 7 is a flow diagram of a method 700 for comparing Internet activity with suspicious feature information according to one or more embodiments. The method 700 includes an embodiment of the step 506 of the method 500. A comparison module (e.g., the comparison module 316 of FIG. 3) may be recalled from memory (e.g., the memory 306 of FIG. 3) and executed by one or more processors (e.g., the CPU 302 of FIG. 3) to perform each and every step of the method 700 as explained in detail below.

The method 700 starts at 702 and proceeds to step 704. As explained throughout the present disclosure, the Internet activity (e.g., the Internet activity 322 of FIG. 3) includes a plurality of images (e.g., the images 324 of FIG. 3). In some embodiments, the method 700 is performed when processor executable instructions that form a comparison module (e.g., the comparison module 316 of FIG. 3) are recalled from memory (e.g., the memory 306 of FIG. 3) by one or more processors (e.g., the CPU 302 of FIG. 3). At step 704, an image is received by the comparison module. At step 706, the image is stored in the memory.

At step 708, the suspicious feature information is accessed. In some embodiments, the suspicious feature information (e.g., the suspicious feature information 414 of FIG. 4) includes various images that are known to misrepresent legitimate computer operations, such as a multimedia player or security software. At step 710, one or more image processing techniques are applied to the suspicious feature information and the image. These image processing techniques are well known in the art and utilized by the comparison module to determine if the image matches any of the various images.

At step 712, a determination is made as to whether the image matches an image within the suspicious feature information. If the image progressing technique identifies a match, the method 700 proceeds to step 714. At step 714, the image is stored in a comparison result (e.g., the comparison result 328 of FIG. 3). A matching image may indicate a strong likelihood that fraudulent software (e.g., the fraudulent software 110 of FIG. 1) is misrepresenting one or more legitimate operations. If the image does not match any image within the suspicious feature information, the method 700 proceeds to step 716. At step 716, a determination is made as to whether there are more images to compare with the suspicious feature information. If the Internet activity includes more images, the method 700 returns to step 702. If the Internet activity does not include any more images, the method 700 proceeds to step 718. At step 718, the method 700 ends.

Figure 8:
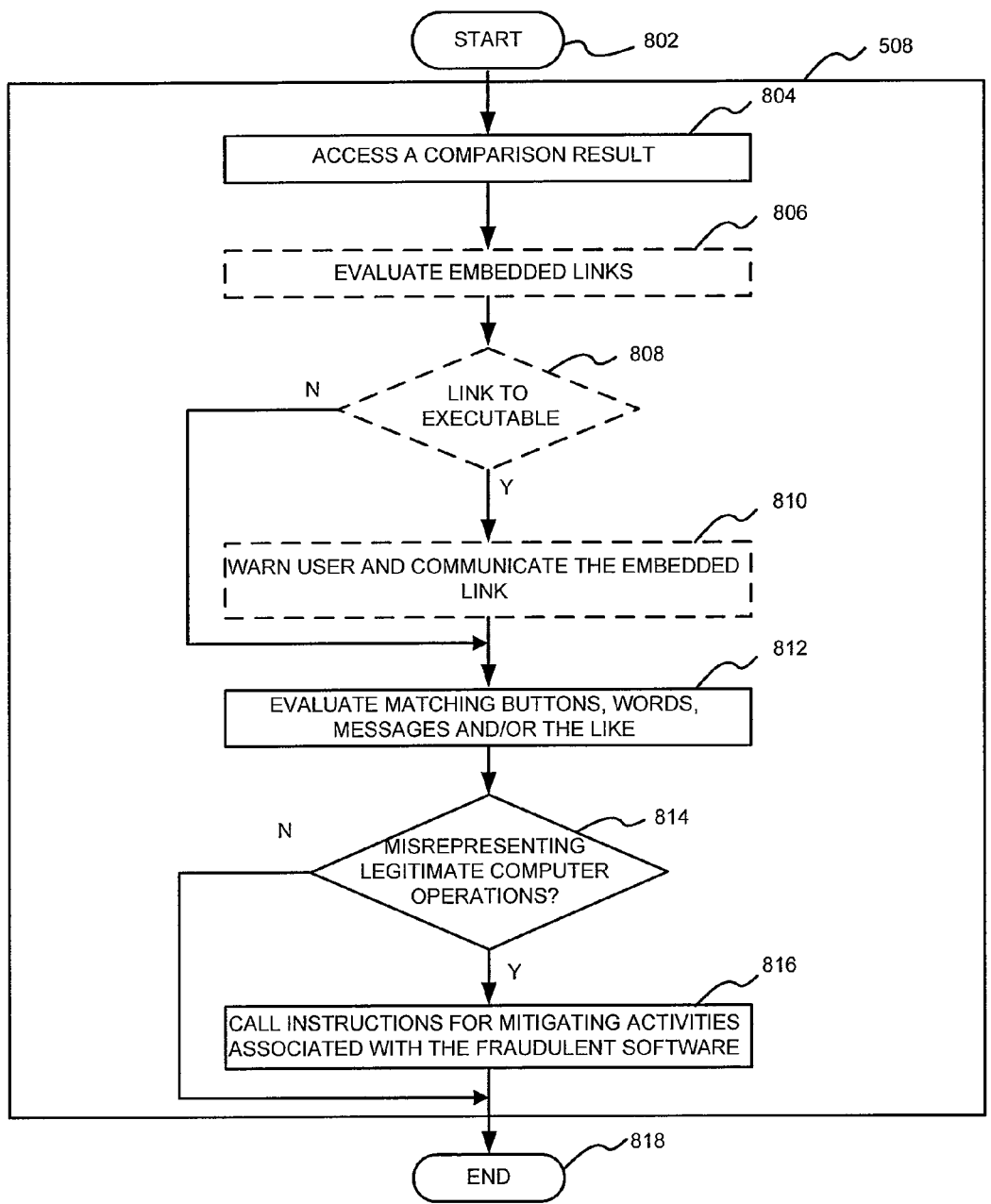
FIG. 8 is a flow diagram of a method for identifying fraudulent software based on a comparison result, according to one or more embodiments.

FIG. 8 is a flow diagram of a method 800 for identifying fraudulent software based on a comparison result, according to one or more embodiments. The method 800 depicts an embodiment of the step 508 of the method 500. Furthermore, an identification module (e.g., the identification module 318 of FIG. 3) may be recalled from memory (e.g., the memory 306 of FIG. 3) and executed by one or more processors (e.g., the CPU 302 of FIG. 3) to perform each and every step of the method 800 as explained in detail below.

The method 800 starts at step 802 and proceeds to step 804. At step 804, a comparison result is accessed. The identification module extracts one or more suspicious images from the comparison result. At optional step 806, one or more embedded links are evaluated. At optional step 808, a determination is made as to whether any of the embedded links redirect the user to an executable file. If there is at least one embedded link to the executable file, then the method 800 proceeds to step 810. At step 810, the user is warned and the at least one embedded link is communicated to a backend server. If, on the other hand, the embedded links are not associated with the executable file, then the method 800 proceeds to step 812.

At step 812, one or more matching buttons, words, messages and/or the like are examined. At step 814, a determination is made as to whether the matching buttons words, messages and/or the like cooperate to misrepresent one or more legitimate computer operations, such as file system scanning for malware, playing multimedia files and/or the like. For example, fraudulent software may produce messages indicating offers to errors, malware infections and/or missing files. These messages may precede an offer to purchase software and/or a link to a website for downloading the software. If the matching buttons, words, messages and/or the like denote a strong likelihood that the fraudulent software is operating within the user computer, then the method 800 proceeds to 816. At step 816, processor executable instructions for mitigating activities associated with the fraudulent software are recalled from the memory and instructed to terminate the fraudulent software. If, on the other hand, the matching buttons, words, messages and/or the like are not misrepresenting the legitimate computer operations, then the method 800 proceeds to 818. At step 818, the method 800 ends.

Figure 9:
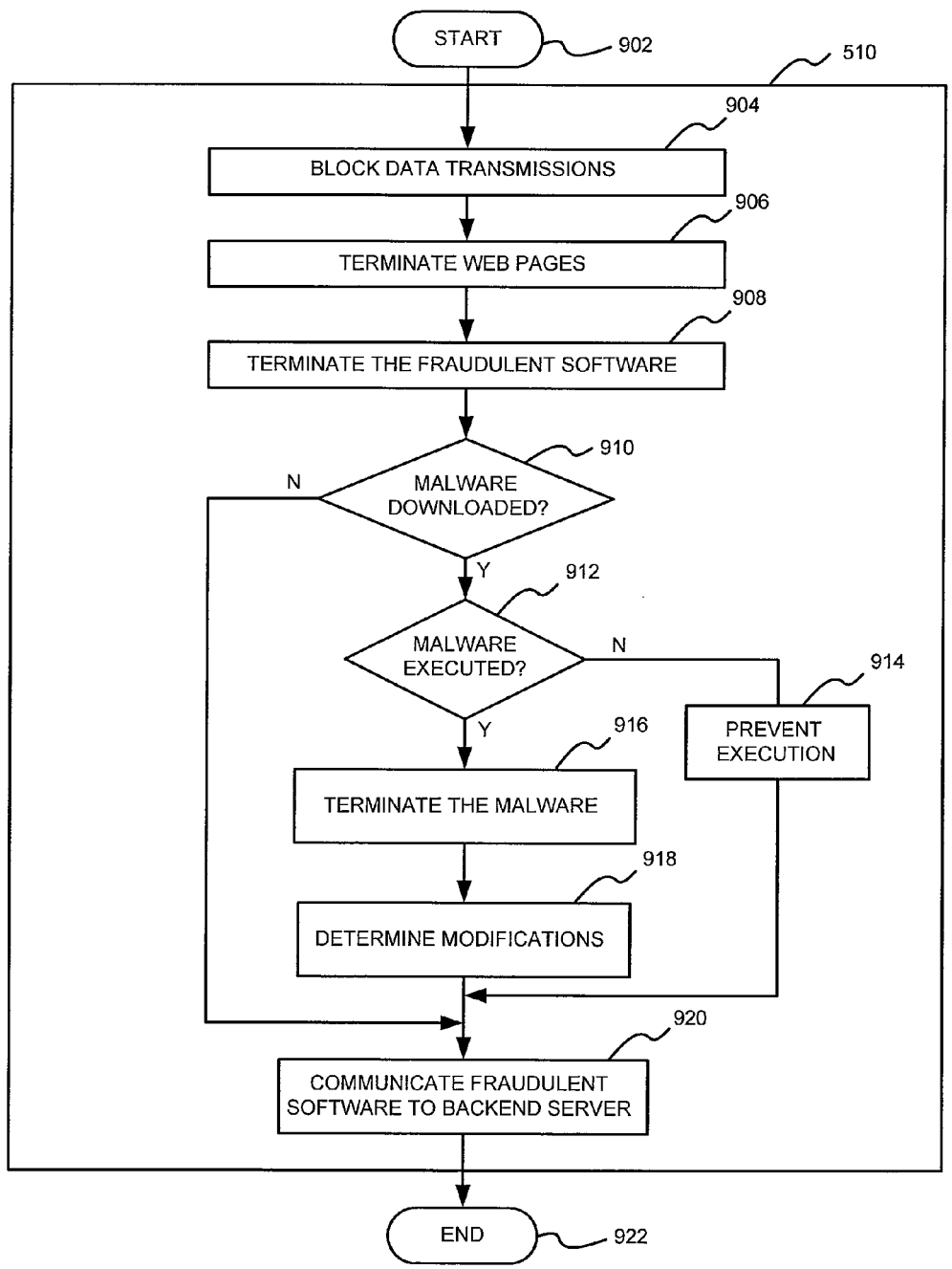
FIG. 9 is a flow diagram of a method for mitigating activities associated with the fraudulent software, according to one or more embodiments.

FIG. 9 is a flow diagram of a method 900 for mitigating activities associated with the fraudulent software, according to one or more embodiments. The method 900 may represent an implementation of the step 510 of the method 500. In some embodiments, a mitigation module (e.g., the mitigation module 320 of FIG. 3) may be recalled from memory (e.g., the memory 306 of FIG. 3) and executed by one or more processors (e.g., the CPU 302 of FIG. 3) to perform each and every step of the method 900 as explained in detail below.

The method 900 starts at step 902 and proceeds to step 904 where data transmissions are blocked. As described in the present disclosure, the mitigation module blocks the data transmissions from a web server hosting fraudulent software because malware may be surreptitiously downloaded to the user computer as an executable. The mitigation module may block the transmission of the malware by terminating a browser currently communicating with the web server and producing one or more web pages associated with the fraudulent software.

At step 906, one or more web pages associated with the fraudulent software are terminated. At step 908, the fraudulent software is terminated. At step 910, a determination is made as to whether the user computer downloaded the malware. If the user computer downloaded the malware, the method 900 proceeds to step 912. At step 912, a determination is made as to whether the malware executed. If the malware did not execute, the method 900 proceeds to step 914. At step 914, execution of the malware is prevented. If the malware executed, the method 900 proceeds to step 916. At step 916, the malware is terminated. At step 918, one or more computer setting modifications are determined. The malware may change browser and/or desktop settings, such as a background image, a screen saver and/or the like. At step 920, the fraudulent software is communicated to a backed server. If, on the other hand, the malware was not downloaded, the method 900 proceeds to step 920. At step 920, the method 900 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for using one or more processors to detect legitimate computer operation misrepresentation in memory, comprising:
   monitoring internet activity associated with a user computer;
   comparing, using at least one computer processor, a first set of at least one computer graphical image received from the internet activity with a second set of at least one computer graphical image associated with electronically stored suspicious feature information to produce a comparison result, wherein the at least one computer graphical image of the second set misrepresents at least one legitimate computer operation to increase a likelihood of malicious computer functions;
   identifying fraudulent software based on the comparison result between the first and second sets of computer graphical images, wherein the comparison result indicates a portion of the internet activity associated with the user computer that misrepresents the at least one legitimate computer operation; and
   mitigating, on the user computer, activities associated with the identified fraudulent software.

2. The method of claim 1, wherein mitigating activities associated with the identified fraudulent software further comprises preventing execution of malware associated with the identified fraudulent software.

3. The method of claim 1, wherein mitigating activities associated with the identified fraudulent software further comprises blocking transmission of malware to the user computer.

4. The method of claim 1, wherein mitigating activities associated with the identified fraudulent software further comprises terminating at least one webpage associated with the identified fraudulent software.

5. The method of claim 1, wherein mitigating activities associated with the identified fraudulent software further comprises terminating the identified fraudulent software.

6. The method of claim 1, wherein mitigating activities associated with the identified fraudulent software further comprises determining at least one computer setting modification caused by malware.

7. The method of claim 1, wherein mitigating activities associated with the identified fraudulent software further comprises communicating the identified fraudulent software to a backend server.

8. The method of claim 1, wherein mitigating activities associated with the identified fraudulent software further comprises terminating execution of malware associated with the identified fraudulent software.

9. The method of claim 1 further comprises transforming the internet activity and the suspicious feature information into the comparison result.

10. The method of claim 1, wherein comparing the internet activity with the suspicious feature information further comprises identifying at least one image depicting at least one of media player software or security software.

11. The method of claim 1, wherein comparing the internet activity with the suspicious feature information further comprises identifying at least one computer graphical image depicting at least one fraudulent alert associated with at least one of media player software or security software.

12. An apparatus for using one or more processors to detect legitimate computer operation misrepresentation in memory, comprising:
    means for monitoring internet activity associated with a user computer;
    means for comparing a first set of at least one computer graphical image received from the internet activity with a second set of at least one computer graphical image associated with electronically stored suspicious feature information to produce a comparison result, wherein the at least one computer graphical image of the second set misrepresents a legitimate computer operation to increase a likelihood of malicious computer functions;
    means for identifying fraudulent software based on the comparison result between the first and second sets of computer graphical images, wherein the comparison result indicates a portion of the internet activity associated with the user computer that misrepresents the at least one legitimate computer operation; and
    means for handling, on the user computer, activities associated with the identified fraudulent software.

13. The apparatus of claim 12 further comprising means for transforming the internet activity and the suspicious feature information into the comparison result.

14. The apparatus of claim 12 further comprising means for preventing execution of malware associated with the identified fraudulent software.

15. The apparatus of claim 12 further comprising means for blocking transmission of malware to the user computer.

16. The apparatus of claim 12 further comprising means for terminating at least one webpage associated with the identified fraudulent software.

17. A non-transitory computer-readable-storage medium comprising one or more processor executable instructions that, when executed by at least one processor, causes the at least one processor to:
    monitor internet activity associated with a user computer;
    compare a first set of at least one computer graphical image received from the internet activity with a second set of at least one computer graphical image associated with electronically stored suspicious feature information to produce a comparison result, wherein the at least one computer graphical image of the second set misrepresents a legitimate computer operation to increase a likelihood of malicious computer functions;
    identify fraudulent software based on the comparison result between the first and second sets of computer graphical images, wherein the comparison result indicates a portion of the internet activity associated with the user computer that misrepresents the at least one legitimate computer operation; and
    mitigate, on the user computer, activities associated with the identified fraudulent software.

18. The computer-readable-storage medium of claim 17 further comprising one or more processor-executable instructions that, when executed by the at least one processor, causes the at least one processor to:
    terminate execution of the identified fraudulent software.

19. The computer-readable-storage medium of claim 17 further comprising one or more processor-executable instructions that, when executed by the at least one processor, causes the at least one processor to:
    prevent execution of malware on the user computer.

20. The computer-readable-storage medium of claim 17 further comprising one or more processor-executable instructions that, when executed by the at least one processor, causes the at least one processor to:
    block transmission of malware to the user computer.

* * * * *